United States Patent [19]

Brandau et al.

[11] Patent Number: 5,420,086

[45] Date of Patent: May 30, 1995

[54] METHOD FOR PRODUCING STABILIZED ZIRCONIUM OXIDE POWDER

[75] Inventors: Egbert Brandau, Alzenau; Martin Kadner, Maintal; Edwin Brauneis, Rodenbach, all of Germany

[73] Assignee: Nukem GmbH, Alzenau, Germany

[21] Appl. No.: 140,140

[22] PCT Filed: May 6, 1992

[86] PCT No.: PCT/EP92/00981

§ 371 Date: Nov. 3, 1993

§ 102(e) Date: Nov. 3, 1993

[87] PCT Pub. No.: WO92/19538

PCT Pub. Date: Nov. 12, 1992

[30] Foreign Application Priority Data

May 9, 1991 [DE] Germany ............... 41 15 172.0

[51] Int. Cl.$^6$ ............................................ C04B 35/48
[52] U.S. Cl. ................................. 501/103; 423/266; 423/608
[58] Field of Search ............... 501/103; 423/608, 263, 423/266, 593

[56] References Cited

U.S. PATENT DOCUMENTS

| | | | |
|---|---|---|---|
| 3,384,687 | 5/1968 | Flack et al. | 264/0.5 |
| 3,776,987 | 12/1973 | Grimes et al. | 264/0.5 |
| 4,043,507 | 8/1977 | Wace | 239/102 |
| 4,140,771 | 2/1979 | Berard et al. | 423/263 |
| 4,664,894 | 5/1987 | Suzuki et al. | 423/265 |
| 4,999,182 | 3/1991 | Baumard et al. | 423/608 |
| 4,999,323 | 3/1991 | Sang et al. | 501/103 |
| 5,011,673 | 4/1991 | Kriechbaum et al. | 501/103 X |

FOREIGN PATENT DOCUMENTS 2230409 12/1974 France .

*Primary Examiner*—Karl Group
*Attorney, Agent, or Firm*—Cushman Darby & Cushman

[57] ABSTRACT

The invention relates to methods for producing stabilized zirconium oxide powder suitable for pressing shaped elements and subsequent sintering to provide high-density ceramic materials. To this end, an aqueous solution of a zirconium salt containing an additive is converted into droplets. The droplets formed are solidified, by the action of ammonia, into gel particles which are then washed, dewatered dried and calcined.

14 Claims, No Drawings

METHOD FOR PRODUCING STABILIZED ZIRCONIUM OXIDE POWDER

BACKGROUND OF THE INVENTION

1. Field of the Invention

The invention concerns a method for producing stabilized zirconium oxide powder with a particle size of at least 100 um, preferably between 100 um and 1000 um, preferably intended for high-density ceramic materials.

2. Description of the Prior Art

Trends in ceramics development have recently been moving toward increasingly high-quality ceramic materials, with the goal of utilizing the advantageous characteristics of these materials—including good temperature resistance, great hardness and wear resistance, and good resistance to chemicals—for engineering purposes.

The first priorities in this effort are to achieve the highest possible density and strength in the shaped elements, to lower the sintering temperature, and in many applications also to increase substantially the purity of the ceramic materials.

To achieve these goals, homogeneous, easily pressed powders of the greatest possible purity, with high sinterability, must be available on an industrial scale; and it must be possible to produce them with simple methods and as cost-effectively as possible.

One promising material that can meet these requirements is partially stabilized zirconium oxide, called PSZ. In this material the tetragonal crystal structure that, in pure zirconium oxide, is stable only at temperatures above 1000° C. is stabilized by the addition of suitable additives. Metal oxides such as CaO, MgO, $Y_2O_3$, $CeO_2$, etc. are used as stabilizing additives. An important factor here is the homogeneity of the powder mixture, which with the usual dry synthesis methods can be achieved only with difficulty and by means of laborious procedures involving several stages, such as generating precursor products by mixing the starting powder, pressing, heat treating, and lastly grinding to a fine powder mixture. Variants aimed at improving homogeneity, such as melting eutectic mixtures, have also been disclosed.

"Wet synthesis" methods have been developed to improve the homogeneity and sinterability of powder mixtures. These involve either precipitating or otherwise consolidating salt solutions which contain the components that form the ceramic, or consolidating hydrosols of these substances by forming gels. Recently, alcoholates of the metals forming the ceramic have also been used to form aels.

In coprecipitation methods, finely dispersed powders are generated—in most cases from chlorides or nitrates of the metals—by hydroxide precipitation using alkaline substances (usually ammonia), or by precipitation of easily decomposed salts of organic acids (such as oxalic acid).

DE-A 34 08 096 describes a method in which a starting powder for a $CeO_2$-stabilized sintered zirconium product is produced by precipitating zirconium and cerium hydroxide with aqueous ammonia. Experience shows, however, that hydroxide precipitations of this kind produce voluminous precipitates that often have poor filtration characteristics and are difficult to wash; in addition they are difficult to handle, and after drying and calcining yield large blocks that must first be laboriously sieved to produce a fine, pourable powder.

Particular attention has been paid recently to sol-gel methods, since they produce powders with high sintering activity and large surface areas. In the simplest case, sols can be produced by hydrolysis of suitable salt solutions at boiling heat (DE-A 34 08 096). When the sol is dried and then calcined, however, the result is once again coarse blocks of gel that take a great deal of extra time to grind into powder.

Conventional methods of sol-gel technology in general and for the production of $Y_2O_3$-stabilized zirconium oxide in particular are described by J. L. Woodhead and D. L. Segal in "Sol-gel processing," Chemistry in Britain, April 1984, pp. 310–313. Considerable space therein is devoted to sol production, and the authors explicitly note that production costs must be commensurate with the value of the ceramic product that is generated. In reality, the procedures described in this article are extremely costly because they are chemically complex. Although solvent extraction as a method for producing stable hydrosols (which must have a large anion deficit) is relatively simple to implement with long-chain amines ($R_3C$—$NH_2$, where $C_{18}<R<C_{22}$), regenerating these amines demands considerable chemical effort and produces large amounts of waste. Hydroxide precipitation and subsequent peptization of the precipitate, washed to remove salts, with a little mineral acid (usually nitric acid) also yields large volumes of filtrate waste. Moreover the sols, which occur initially in dilute form, must be reconcentrated by boiling. The method involving thermal decomposition of metal salts of volatile acids, such as chlorides or nitrates, also has disadvantages: not only because of the corrosive effect of HCl or $NO_x$ vapors, but also because not all elements form such salts. In addition, peptizable oxide hydrates are obtained only under precisely defined conditions, as described using the example of thorium nitrate.

GB-B 1 181 794 describes the production of these kinds of zirconium hydrosols or hydrogels with a substantial anion deficit. It is important in this connection that a precise molar $NO_3^-/Zr$ ratio of between 1.0:1 and 1.1:1 be maintained. A major disadvantage is the fact that this sol production procedure must be preceded by the aforementioned hydroxide precipitation step, with the nitrate subsequently washed out, before peptization to the sol can occur with a specific small quantity of nitric acid. The gel produced by drying has the disadvantage that it occurs in fragments and contains a relatively large amount of nitrate. When calcined, it therefore gives off $NO_x$ and has a severely corrosive effect, and in addition must still be finely ground. Precipitation py amine extraction has the disadvantage that the amine must be regenerated and the organic solvent recovered.

The disadvantage of the variants of the sol-gel method thus consists primarily in the difficult process engineering associated with sol production, whether by precipitation of the metal hydroxides and peptization, or by removal of the anions using long-chain organic amines (solvent extraction), or by thermal decomposition of salts of volatile acids (nitric acid, oxalic acid) followed by peptization of the metal oxides.

EP 0 261 590 A2 indicates a method for producing metal oxides or mixed metal oxides, in which an aqueous solution of a zirconium salt, which can contain an additive, is atomized ultrasonically. This generates droplet sizes between 10 and 50 um.

Although the use of ultrasound has the advantage that small droplets can be generated, a disadvantage is that droplets with highly variable diameters are produced. Twin and triplet droplets are also observed. Moreover, a uniform spherical geometry is not obtained.

A method for producing a zirconium dioxide powder is described in DE 39 32 781 A1. With this, zirconium chloride containing water of crystallization is melted, and gaseous ammonia is then introduced into the melt.

A known method for producing ceramic powder is to introduce a reaction gas into an emulsion (EP 0 304 243 A1). Further methods for producing zirconium powders or other powders are indicated by U.S. Pat. Nos. 3,384,687, 4,664,894, and 4,140,771.

SUMMARY OF THE INVENTION

The underlying object of the present invention is to find a method for producing stabilized zirconium oxide powder for high-density ceramic materials with which a homogeneous, easily pressed, sinterable powder with a large surface area can be generated, which moreover has good pourability and is intended to be economical to produce. The resulting particles are also intended to have uniform spherical geometry with little variation.

According to the invention, the object is substantially achieved by the fact that an aqueous solution of a zirconium salt in droplet form, containing at least one hardened and/or finely dispersed additive, is atomized by means of electromagnetic vibratory excitation; that the droplets are first preconsolidated by the action of ammonia gas into discrete gel particles and then collected in an aqueous ammonia precipitation bath and therein hardened into discrete solid gel particles; and that thereafter the gel particles are washed until free of ammonia salts, and then
dewatered,
dried, and
calcined.

DETAILED DESCRIPTION OF THE INVENTION

By coprecipitating aqueous zirconium salt solutions with added salts of stabilizing metal oxides, it is possible to produce homogeneous powders with good sintering activity.

According to the invention, this coprecipitation of aqueous zirconium salt solutions and additives is achieved by atomizing the solution and by the action of ammonia on the droplets. Electromagnetic vibratory excitation is applied in order to achieve a narrow range of particle size. This can be done, for example, by electromagnetically vibrating a nozzle and a line through which the solution flows and by which it is atomized.

It has been found, surprisingly, that zirconium hydroxide with additives can be precipitated as a gel even when using solutions in which the molar nitrate/zirconium ratio exceeds 1.1:1 and that contain a water-soluble organic polymer, preferably polyvinyl alcohol, in solution.

For example zirconium salts such as carbonates, nitrates, or chlorides with a stoichiometric composition, such as for example $Zr(NO_3)$, or $ZrO(NO_3)_2$, can also be used.

If the pH of such solutions is too low for spontaneous hydroxide precipitation in the droplets, it has proven to be advantageous first to neutralize the solution with ammonia, to a maximum of just before the precipitation point. The ammonium salt formed thereby does not interfere with the process, since it is produced later in any case during precipitation.

According to the invention it has proven advantageous to preharden the droplets chemically, before immersion in the ammonia solution, in an atmosphere of gaseous ammonia. This action forms a thin skin on the droplet surface during precipitation, thus stabilizing the spherical shape. This prevents the particles from bursting at the surface of the ammonia solution.

This type of coprecipitation according to the invention, from solution in the presence of a dissolved organic polymer, yields oxide hydrates with a gel structure and a large surface area. These powders therefore have particularly high sintering activity, and yield high sintered densities for the shaped elements produced from them. According to the invention, coprecipitation of zirconium oxide and additives from a homogeneous solution of these components in the presence of a dissolved organic polymer, preferably polyvinyl alcohol, yields ideally mixed (i.e. completely homogeneous) powders of consistent quality and high sinterability. If an additive cannot be dissolved, or is precipitated because the pH of the zirconium salt solution is too high, the additive can also be suspended in the solution. In this case it is particularly advantageous to add to the solution a dispersing agent, preferably a primary alcohol, especially isopropanol or tetrahydrofurfuryl alcohol. A homogeneous powder with high sinterability is also obtained if the additive is present in extremely finely dispersed form, for example as a finely ground powder or a freshly precipitated amorphous precipitate.

A further advantage of coprecipitation of oxide hydrates in droplet form is that it can produce regular particles with a narrow particle size spectrum; the particle size of the solid can be controlled by adjusting the droplet size.

This makes it possible to vary the particle size over a wide range, preferably between 0.1 and 1 mm. Larger particles can also easily be produced, however, using a method which breaks down a stream of liquid into droplets. According to the invention, the droplets are generated by the action of mechanical vibrations on the liquid flowing out through a nozzle, by transferring electromagnetic vibrations either directly onto the nozzle or onto the wall of a flexible hose through which the liquid flows shortly before it emerges from the nozzle.

The addition of a dissolved organic polymer not only has the advantage that the additives and zirconium hydroxides are precipitated as gels, but at the same time also makes it possible to establish a solution viscosity that is advantageous for the formation and stabilization of droplets. Even small quantities, ranging from 1 to 10 g per liter of solution, are sufficient for this. Polyvinyl alcohol has proven particularly successful, in particular with regard to the removal of as much as possible of this adjuvant during the calcination step. However other substances of this kind, such as polyethylene glycol, methyl cellulose, or dextrin, can also be used successfully.

The uniformity of the droplets and the freshly precipitated solid particles produced from them guarantees uniform treatment during subsequent processing, ensuring that powders with reproducible characteristics are generated; this is one of the most important prerequisites for the production of high-quality sintered shaped elements. The uniformity of the particle properties, for example density and diameter, and good particle pourability, allow uniform filling of press molds for the production of green compacts that are then subjected to the sintering process. A particular advantage with respect to mold filling is the fact that when spherical particles with a narrow particle spectrum in the range between 0.1 mm and 1 mm are used, no agglomerates form, and identical fill factors of approximately 0.6 are always routinely achieved. By using a plurality of particle types of different sizes, for example particles with diameters of about 0.8 mm and about 0.2 mm, the fill factor can be raised further to approximately 0.8 by filling up the gaps between the larger particles. This results in particularly short press travel lengths.

Uniform treatment of the particles in the subsequent process steps (washing, drying, and calcining) also guarantees uniform properties with regard to porosity and crush strength. It has been demonstrated that the production method according to the invention can produce particles with a particularly low crush strength of less than 1 Newton per particle, the properties of which are comparable to those of a granular powder. While these particles have sufficient strength for handling as bulk material, their cohesion is nevertheless so loose that they crumble at the slightest pressure into a powder whose original shape is no longer evident. The method according to the invention thus prevents any occurrence of "blackberry structure," which usually occurs when bulk particles with a regular (spherical) structure are pressed together; and the advantages resulting from a coprecipitated, pourable powder are utilized in a particularly profitable manner for the production of ceramic bodies with a dense, homogeneous structure, which is in itself surprising to one skilled in the art.

The chemical reaction between metal salt solutions and ammonia produces ammonium salts. Because of the preferred utilization of metal nitrates and chlorides, ammonium nitrate and ammonium chloride are predominantly formed. These substances must be washed out before the particles are processed further, since otherwise the particles would be destroyed during heat treatment as these salts decomposed. Unlike the situation when the usual highly voluminous hydroxide precipitates are washed out, washing of the spherical gal particles produced with the method according to the invention presents no difficulties, since the exchange rate (diffusion) between particles and surrounding liquid is extremely rapid, i.e. takes only a few minutes. This makes it possible to configure the washing process very simply on a continuous basis, since in this manner the fluid behavior of the particles in the aqueous phase can be utilized to particular advantage.

After washing, the particles are usually dried at 100° to 180° C. in air, evaporating the washing fluid and producing dry, spherical gel particles. These gel particles are then calcined in air in order to decompose the organic polymer. This calcination process proceeds in the temperature range between 300° and 1000° C., but it is performed with particular advantage, in terms of attaining good particle properties as regards pressability into shaped elements and sinterability of the compacts, at between 600° and 900° C.

To improve the reproducibility of calcining results, it has proven useful to work under flowing air at a constant humidity in the range between 10 g and 30 g of water per cubic meter of air. Depending on the composition of the starting solution, residual carbon contents ranging from 10 to 50 ppm, BET surface areas ranging from 10 to 200 m$^2$/g, and crush strengths from <0.2 to 2 Newtons/particle can be specifically achieved, with particle sizes between 0.2 mm and 0.6 mm final diameter for particles containing at least 80 wt. % $ZrO_2$.

If water is used as the washing liquid, this produces a cubic crystal structure in the powder, as demonstrated by X-ray diffraction studies of $Y_2O_3$-stabilized $ZrO2$ particles. This structure is, however, not desirable for the production of high-strength shaped elements.

It has now been found, surprisingly, that removal of the water from the gel particles using an alcohol that is miscible with water, preferably isopropanol, followed by drying and calcining, leads to a $Y_2O_3$-stabilized $ZrO_2$ powder that contains three crystal structures—monoclinic, tetragonal, and cubic—together. Particles made up of these powders are well suited for the production of sintered partially stabilized $ZrO_2$ shaped elements. It has been shown that, for example, sintering under hydrogen at 1700° C. can produce cylindrical shaped elements of very high density (between 95% and 98% of theoretical density) without cracking. Water removal from the particles is not restricted to isopropanol, but can be performed with equally good results using, for example, methanol or butanol as well.

Further details, advantages, and features of the invention are evident not only from the Claims and the features derived therefrom, individually and/or combination, but also from the following description of Examples which explain the method according to the invention.

EXAMPLE 1

An aqueous solution of zirconium nitrate and yttrium nitrate, with added polyvinyl alcohol, was used to produce high-density ceramic bodies made of $Y_2O_3$-stabilized $ZrO_2$. Each liter of this solution, referred to as the pouring solution, contained:

47.5 g Zr in the form of a neutralized $Zr(NO_3)$, solution;

2.5 g Y as a $Y(NO_3)_3$ solution;

5.0 g polyvinyl alcohol (PVA), dissolved in water.

The neutralized $Zr(NO_3)_4$ solution was produced by dissolving 180 g $Zr(NO_3)$, x aq in 500 ml water, and slowly adding 85 ml of a 7.4-molar ammonia solution at room temperature. This raised the pH to 1.1. Each liter of this neutralized solution contained 1 mol Zr and 4 mol NO,-, 1 mol of the latter as $NH_4NO_3$.

The $Y(NO_3)_3$ solution was produced by dissolving $Y_2O_3$ powder in nitric acid and diluting to 0.664 mol Y/liter.

The pouring solution was converted into droplets which, by a chemical reaction with ammonia, formed solid, spherical particles of coprecipitated zirconium and yttrium oxide hydrate gel. The pouring solution was forced from a reservoir, through a flexible hose 5 mm in diameter, to a nozzle 0.35 mm in diameter, where the liquid flowed out and droplets formed. Just upstream from the nozzle, the flexible hose was mechanically connected to an electromagnetic vibrator system in such a way that the vibrations of the vibrator were transferred through the hose wall to the flowing liquid. As a result, the stream of liquid flowing out into the air broke up into particles of identical size; the number of droplets per second corresponded to the vibrator frequency of 1200 Hz.

The droplets then fell over a length of about 8 cm through a gaseous ammonia atmosphere, where a solid surface skin formed. The original droplets were then collected, as discrete round particles, in an ammonia solution. After a residence time of 30 minutes, the particles were washed in water until free of nitrates, then dewatered with isopropanol and dried in a rotary evaporator.

The dry, easily pourable particles were calcined on quartz dishes for 3 hours at 500° C. in air in a muffle furnace. The resulting product was a coarsely dispersed powder of spherical particles with a narrow particle size distribution ranging from 250 to 300 um; its composition was $ZrO_2/4.7$ wt. % $Y_2O_3$.

The powder was placed in the mold of a press and processed into cylinders 7 mm in diameter and 7 mm high at a pressure of 260 MPa. The green density of these green compacts was 2.46 g/cm$^3$. The cylinders were then sintered at 1500° C. for 2 hours in air, achieving a sintered density of 5.94 g/cm$^3$, which corresponds to more than 958 of the theoretical density.

EXAMPLE 2

An aqueous pouring solution of zirconium nitrate and yttrium nitrate with added polyvinyl alcohol was processed as in Example 1, forming a coarsely dispersed powder of spherical particles with diameters of 250 to 300 um, with the composition $ZrO_2/4.7$ wt. % $Y_2O_3$.

The pouring solution again contained 47.5 g/l Zr in the form of neutralized zirconium nitrate solution, and 2.5 g/l Y as $Y(NO_3)_3$ solution, as well as 5 g/l PVA dissolved in water.

The neutralized zirconium nitrate solution was produced by dissolving commercial zirconium carbonate in nitric acid and adding ammonia solution, as follows:

1000 g zirconium carbonate, containing 28.6% Zr and 6.6 wt. % $CO_3^{2-}$, was dissolved in 942 ml 5 mol/l $HNO_3$. The clear solution was characterized as follows:

Molar ratio $NO_3^-$:Zr 1.50:1
pH-0.2
Zr content 189.3 g/l
Specific gravity 1.352 kg/l
Viscosity 4 mPa.s 250.9 ml of this solution, corresponding to 47.5 g Zr, was neutralized drop by drop with 51.3 ml 7.35 mol/l ammonia, until the onset of turbidity. This raised the pH to 1.9; the viscosity remained unchanged.

The particles were then washed first in water and then in isopropanol, then dried at 80° C.; small portions were then calcined in air for 24 hours at 400°, 500°, 600°, and 700° C. Their crystal structure was then examined via X-ray structural analysis. It was found in all cases that a mixture of the monoclinic, cubic, and tetragonal crystal lattices was present.

The greater portion of the powder consisting of dried particles was calcined at 700° C. for 2 hours in air, then placed in a mold and pressed at a pressure of 520 MPa into cylinders with a green density of 2.94 g/cm$^3$. Subsequent sintering in air at 1200° C. yielded crack-free sintered elements with a density of 5.72 g/cm$^3$; at a sintering temperature of 1500° C., a density of 5.94 g/cm$^3$ was achieved, corresponding to more than 958 of the theoretical density.

A further portion of the particles was withdrawn right after water washing, dried separately, then calcined for 24 hours in air (again at 400°, 500°, and 600° C.), and then subjected to an analysis of crystal structure. It was found in all three cases that only the cubic crystal structure was present. The cylinders produced from this powder had numerous cracks after sintering, and were therefore unusable.

EXAMPLE 3

Particles produced in accordance with Example 2 with a composition of $ZrO_2/4.7$ wtt $Y_2O_3$, calcined in air for 2 hours at 700° C. were processed at a pressure of 330 MPa into cylinders 11 mm in diameter and 11 mm high.

These cylinders, which had a green density of 2.80 g/cm$^3$, were sintered at 1400° C. for 20 hours in air, reaching a sintered density of 5.93 g/cm$^3$, corresponding to 95% of theoretical density. Several green compacts were sintered for 2 hours at 1650° C. in hydrogen, and achieved a density of 5.95 g/cm$^3$, which is 96% of the theoretical density.

EXAMPLE 4

A pouring solution with the following composition:
45 g Zr/l
5 g Y/l
5 g PVA/l
was processed in accordance with Example 1 into a coarsely dispersed powder made of spherical particles with a diameter of 200–300 um and a composition $ZrO_2/9.5$ wt. % $Y_2O_3$. 2377 ml of the zirconium nitrate solution specified in Example 2, corresponding to 450 g Zr, was neutralized with 482 ml 7.35 mol/l ammonia until the onset of turbidity, and mixed with 846 ml of a 0.664 molar yttrium nitrate solution, as well as 625 ml of an 8% PVA solution and water to make 10 liters of pouring solution.

The particles, dried in accordance with Example 1 but using a ten-nozzle plate with ten times the throughput, were calcined in air for 3 hours at 700° C., then characterized as follows based on a representative sample:

Average particle diameter 245 um
Standard deviation 5 um
Mercury density 2.08 g/cm$^3$
Crush strength 0.76 Newtons/particle
Standard deviation 0.15 Newtons/particle
BET specific surface area 38.2 m$^2$/g
Ignition loss 2.03 wt. %
Carbon content 0.02 wt. %

The particles were processed in a mold at a pressure of 610 MPa to form cylindrical elements 11 mm in diameter and 11 mm high, with a green density of 2.85 g/cm'. Sintering for two hours in air at 1400° C. yielded crack-free cylinders made of $ZrO_2/9.5$ wt. % $Y_2O_3$ with a density of 5.82 g/cm$^3$, corresponding to 95% of the theoretical density.

EXAMPLE 5

Five liters of a pouring solution with the following composition:
43.4 g Zr/l
6.6 g Ce/l
5.0 g PVA/l
were converted as in Example 1 into a coarsely dispersed powder of spherical particles with a particle size of 200–300 um and a composition $ZrO_2/9$ mol % $CeO_2$.

1146 ml of the zirconium nitrate solution mentioned in Example 2, corresponding to 217 g Zr, was neutralized with 234 ml 7.35 molar ammonia until the onset of turbidity, and then mixed with 236 ml of a 1.0 molar $Ce(NO_3)_3$ solution as well as 313 ml of an 8 wt. % PVA solution to form a homogeneous pouring solution. This pouring solution was converted into droplets as in Example 1 but using a ten-nozzle plate with ten times the throughput, then consolidated with ammonia, washed with water and isopropanol, dried, and calcined for 3 hours at 700° C. in air.

Analysis of a representative sample yielded the following data:
  Average particle diameter 251 um
  Standard deviation 3 um
  Mercury density 1.97 g/cm$^3$
  Crush strength 0.47 Newtons/particle
  Standard deviation 0.18 Newtons/particle
  BET specific surface area 33.2 m2/g
  Ignition loss 1.4 wt. %
  Carbon content 0.016 wt. %

X-ray structural analysis revealed that $CeO_2$ was present in the cubic crystal form, while $ZrO_2$ yielded reflections for three lattice types (cubic, tetragonal, and monoclinic).

The powder, consisting of uniform particles, was placed in a mold and pressed at a pressure of 450 MPa into cylinders 11 mm in diameter and 11 mm high with a green density of 2.78 g/cm$^3$. Sintering for 4 hours in air at 1500° C. yielded crack-free elements with 95% of theoretical density (6.03 g/cm$^3$).

EXAMPLE 6

A pouring suspension of the following composition was used to produce coarsely dispersed powder consisting of $Y_2O_3$-dispersed $ZrO_2$ with homogeneously distributed $TiO_2$:
  47.5 g/1Zr
  2.5 g/1Y
  60.0 g/1TiO$_2$ powder
  50.0 g/1THFA
  5.0 g /1PVA The suspension was produced by mixing neutralized zirconium nitrate solution, production of which is described in Example 2, with yttrium nitrate solution, water, and tetrahydrofurfuryl alcohol (THFA); dispersing fine $TiO_2$ powder (Kronos A, trade name of Kronos Titan GmbH) using an Ultraturrax; and lastly slowly mixing in the PVA solution. This suspension was processed as in Example 1, with continuous stirring, into spherical particles. After washing with water and isopropanol and drying in a rotary evaporator, the particles were calcined for 2 hours at 700° C. in air. A representative sample yielded the following analysis:
  Average particle diameter 288 um
  Mercury density 1.49 g/cm$^3$
  BET specific surface area 61.0 m$^2$/g
  Ignition loss 3.2 wt. %
  Carbon content 0.06 wt. %

The composition was 50.4 wt. % $ZrO_2$, 2.5 wt. % $Y_2O_3$, and 47.1 wt. % $TiO_2$.

The powder composed of these particles was pressed in a mold into cylinders 7 mm in diameter and 7 mm high. The green compacts were sintered for 2 hours at 1400° C. in air, yielding crack-free sintered elements with a density of 4.8 g/cm$^3$.

We claim:

1. A method of producing stabilized zirconium oxide powder having a particle size of at least 100 μm which comprises atomizing, by means of electromagnetic vibratory excitation, an aqueous solution of a zirconium salt in the form of zirconium nitrate having a molar nitrate/zirconium ratio exceeding 1.1:1, said solution containing at least one hardened and/or finely dispersed additive and having a pH suitable for precipitation of droplets atomizing from said solution, preconsolidating the resulting atomized droplets of said solution by contact with ammonia gas, and then collecting said droplets in an aqueous ammonia precipitation bath where they are hardened into discrete solid gel particles, washing the particles until free of ammonia salts, dewatering the particles with a water-miscible alcohol, drying the particles, and sintering the particles.

2. A method as set forth in claim 1 in which the size of the particles is 100 μm to 1,000 μm.

3. A method as Set forth in claim 1 in which the aqueous solution contains, as additive, at least one member of the group consisting of water-soluble metal nitrates and finely dispersed metal oxides.

4. A method as set forth in claim 1 in which the aqueous solution contains, as additive, at least one member of the group consisting of yttrium nitrate, cerium nitrate, titanium dioxide, water-soluble organic polymers, and dispersing agents.

5. A method as set forth in claim 4 in which the organic polymer is polyvinyl alcohol.

6. A method as set forth in claim 4 in which the dispersing agent is selected from the group consisting of isopropanol and tetrahydrofurfuryl alcohol.

7. A method as set forth in claim 1 in which mechanical vibrations to atomize the aqueous solution are generated by transferring electromagnetic vibrations onto a flexible tube wall.

8. A method as set forth in claim 1 in which the gel particles are calcined at a temperature in the range 600° C. to 900° C.

9. A method as set forth in claim 1 in which the particles are calcined at a humidity of between 10 g and 30 g of water vapor per cubic meter of air.

10. A method for producing high-density ceramic elements from $Y_2O_3$-stabilized $ZrO_2$ which comprises atomizing, by electromagnetic vibratory excitation, a solution, to form droplets, said solution containing a polyvinyl alcohol solution and a zirconium nitrate solution in which the molar nitrate/zirconium ration exceeds 1.1:1 and which has a pH suitable for precipitation of said droplets, exposing the atomized droplets to an atmosphere of gaseous ammonia to spontaneously form a solid surface skin, collecting the surface-consolidated particles resulting therefrom in an ammonia solution, washing the particles free of nitrates after they have resided in the ammonia solution, dewatering the particles with an alcohol, drying the particles so that they are easily pourable, and calcining and sintering the particles.

11. A method as set forth in claim 10 in which the surface-consolidated particles reside in the ammonia solution for approximately 30 minutes.

12. A method as set forth in claim 10 in which the particles are calcined in air.

13. A method as set forth in claim 12 in which the particles are calcined at a temperature in the range 400° C.–700° C.

14. A method as set forth in claim 13 in which the particles are calcined at a temperature of 500° C.

* * * * *